LINKING CIRCUIT UTILIZING ONLY THE LINEAR RANGE OF THE REPEATER CORE

Filed March 22, 1962

United States Patent Office 3,277,308

Patented Oct. 4, 1966

3,277,308

LINKING CIRCUIT UTILIZING ONLY THE LINEAR RANGE OF THE REPEATER CORE

Edmund Ptacnik, Munich, Germany, assignor to Siemens & Halske Aktiengesellschaft Berlin and Munich, a corporation of Germany Filed Mar. 22, 1962, Ser. No. 181,639
Claims priority, application Germany, Mar. 27, 1961, S 73,150
2 Claims. (Cl. 307—88)

The invention disclosed herein relates to circuits, especially for use in telephone systems, comprising transformers, in which only the linear working range is utilized, and is particularly concerned with circuits for processing messages which are delivered in the form of binary signals which can assume two different values, often identified as 0 and 1. The processing leads to linking the various delivered signals, resulting likewise in a binary signal. Such circuits will be hereinafter referred to as linking circuits.

Linking circuits with definite linking functions are designated, for example, as Or-gate circuits or And-gate circuits. Many different embodiments for such linking circuits are known, which are constructed with the aid of different switching or circuit elements. These linking circuits may also differ so far as the mode of operation thereof is concerned. Thus, there are linking circuits which deliver the resulting signal for the entire presence of the signals which are to be linked. These are statically operating linking circuits which are constructed, for example, with the aid of resistors and rectifiers. However, linking circuits may also be operated impulse-wise instead of statically. In such case, the signal which denotes the result of the linking, the result signal, is represented by a more or less brief impulse or by the absence of such impulse.

Such linking circuits are often constructed with the aid of transformers, usually ring cores having windings consisting of a few turns. The core of such a transformer is in known circuits of this kind made of ferromagnetic material with rectangular magnetization loop. The two remanence points of the magnetization loop are utilized for marking the two conditions of binary signals (see Nachrichtentechnische Zeitschrift, 1957, issue 8, page 391). This is also particularly true for the signal representing the signal which signifies the result of the linking of the supplied signals. The result signal is at a desired instant delivered by the linking circuit responsive to a readout impulse. A plurality of transformers provided with several windings must be provided and interconnected in definite manner in order to effect more complicated linking of a greater number of signals.

Impulse-wise operated linking circuits with transformers or repeaters are likewise known, wherein the remanence of ferromagnetic materials is not utilized. Accordingly, transformers may be used in such linking circuits, the core material of which has largely a linear magnetization curve. In such circuits, the linking function takes place in a physically different manner, owing to the utilization of other effects occurring in the transformers. Thus, it is, for example, known (see Swiss Patent 331,029) to construct a gate circuit with the aid of a transformer having two windings, wherein only the linear part of the magnetizing curve need be triggered. A rectifier is disposed ahead of one end of the primary winding of the repeater, to which is conducted a pass voltage or a blocking voltage, so that impulses conducted to the other end of the primary winding effect, or do not effect, a current flow.

Accordingly, both signals which are to be evaluated, are extended to the same winding. The secondary winding of the transformer therefore delivers, or does not deliver, impulses. What is utilized here, is the property of transformers to transfer a signal impulse, conducted to one winding, to another winding, from which an impulse is given off, representing the result signal. The power expanded incident to the delivery of this impulse must be derived from one of the signals which had been extended to the circuit for processing therein. Accordingly, this linking circuit does not have the property to amplify the signals extended thereto. It is under some circumstances also of disadvantage that the signals which are to be linked have to be mutually electrically interconnected.

It is in the case of elaborate message processing systems, for example, telephone systems, very much desired to use linking circuits which are adapted to effect the respective linking and coincident therewith an amplification. The evaluation of signals which are delivered with low power is thereby advantageously affected. Upon using in such linking circuits transformers as important components, it is with proper construction possible to obtain electric separation between the circuits over which the signals are delivered which are to be linked.

The linking circuits to be described below are constructed in this manner. The advantages resulting therefrom facilitate considerably the insertion of linking circuits between the individual parts of the message processing arrangement. It has also been found that it is possible, with the use of transformers in which the linear part of the magnetization curve of the core material is utilized, to obtain the result signals extraordinarily quickly, for example, in fractions of microseconds.

Accordingly, the invention points a way for constructing in particularly advantageous manner a linking circuit with amplifier properties for carrying out linkings between two or more binary signals, with the use of a transformer with a plurality of windings, which has to be triggered, during the linking, merely in the linear part of the magnetization curve of the core material.

In accordance with the linking circuit of the present invention, one of the signals which are to be linked is conducted to each winding, the alteration of the binary value of the signal to be linked causing a voltage alteration at the ends of the windings which are provided with rectifiers disposed ahead thereof, such voltage alteration changing the operating condition of the rectifiers, so that the output impulse is in a given case delivered over the other ends of the remaining windings, responsive to a readout impulse which is conducted over the other end of one of the windings, whereby the rectifier connected with such winding is made conductive and supplies the power for the result signal which signifies the result of the linking operation, such result signal being respectively represented by the appearance or non-appearance of an output impulse which is in a given case delivered over the other ends of the remaining windings.

In the linking circuit according to the present invention, the operation is restricted merely to the linear part of the magnetization curve, and the remanence of the magnetic core material is not utilized. It is therefore unnecessary to provide for the linking functions special restoring pulses so as to obtain prior to a linking of signals a given initial magnetic condition of the core material.

Since the remanence of the magnetic core material need not be utilized, it is likewise unnecessary to trigger the magnetization curve to its remanence points. The triggering which is required is, therefore, in any case very quickly concluded, thus making it possible to operate the linking circuits of the invention with very high speed. Owing to the resulting great changes of the magnetic flux ($-d\phi/dt$), voltages will be obtained in the output windings which can be very well evaluated even in the case of small ring cores with very few or with only one winding. All these advantages make it possible to use the linking circuits according to the invention in many circumstances.

The various objects and features of the invention will appear from the description of embodiments thereof which will be rendered below with reference to the accompanying drawing.

Figure 5:
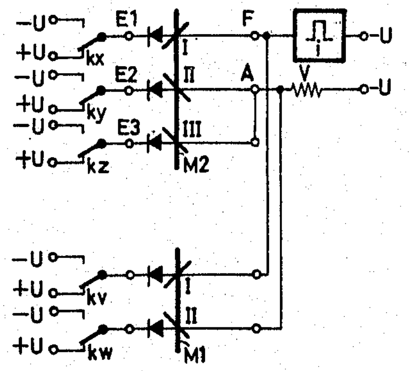
Figure 6:
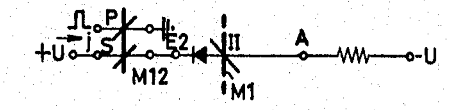

FIG. 5 indicates the manner of combining a plurality of individual linking circuits; and FIG. 6 shows an example for obtaining the necessary voltage variation from impulse-like signals.

The manner of circuit representation will now be explained with reference to FIG. 1 (see also Proceedings of the IRE, May 1955, page 572 et seq.).

Figure 1:
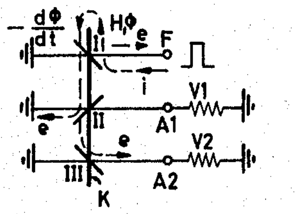
FIG. 1 is intended to aid in explaining the particular manner of circuit representation employed.

The core of the transformer is in FIG. 1 indicated by a prominent vertical line K. This vertical line is perpendicularly cross by windings I, II, III. The sense of direction of winding is indicated by an angularly slanting line extending through the respective crossing point. Windings which are indicated by identically slanting lines have the same sense of winding direction; lines slanting perpendicularly thereto indicate windings which are wound in opposite sense of direction.

The slanting lines make it possible to ascertain the polarity of an impulse induced in a given winding. For example, if the positive current impulse *i*, indicated in FIG. 1, is conducted to the winding I, a voltage will in known manner be induced in this winding, the polarity of which is opposed to that of the voltage of the current impulse *i*. A voltage with this polarity is also induced in other windings which have the same winding sense as the winding I. The winding III is such a winding, the slanting line thereof extending parallel to the slanting line applied to winding I. The appearance of these induced voltages is indicated by arrows marked *e*. Assuming the winding III to be disposed in a closed circuit, a current impulse will flow therethrough in the direction of the arrow *e*. The winding II extends in opposite sense of direction, as indicated by the respective slanting line which points in opposite direction as compared with the slanting lines of windings I and III.

The slanting lines which give the sense of direction of the respective windings can also be considered in the sense of mirrors for the direction of the electrical values which are concerned. Thus, when the slanting line of the winding I is mirrored in the direction of the supplied impulse *i*, there will be obtained a direction of the magnetic field strength H and the magnetic flux $\phi$ in the core. The direction of a flux change which induces a voltage in a winding, which is equal to $-d\phi/dt$ is then oppositely oriented. Upon mirroring this direction at the slanting line designating a winding, there will be obtained the polarity of the induced voltage impulse and the direction of the flow of the impulse current. These mirrorings are indicated in FIG. 1 by dash lines and arrows marked with the above noted information.

The arrangement shown in FIG. 2 will now be described to give a first example of a linking circuit according to the present invention. This linking circuit serves for linking two binary signals and operates as an And-gate. The cores of the transformer M1 is provided with two windings I and II which are wound in opposite sense of direction. The rectifiers G*x* and G*y* which are respectively disposed ahead of the windings, are polarized so that they operate in pass direction responsive to the voltage applied in the presence of the value 1 of the binary signals *x* and *y*. The voltage alteration related to the alteration of the signals which are to be linked, is effected with the aid of break-make contacts *kx* and *ky*. The operating position of the contact *kx* depends upon the binary value of the signal *x*. In the circuit example shown in FIG. 2, the dependence is such that the contact is in normal position, in which it is shown, when the signal *x* has the value 0, in which case the voltage +U is placed on the winding I. The rectifier G*x* will in such case operate in blocking direction; in case the signal *x* has the value 1, the contact *kx* will be in actuated position. Upon placing the voltage —U on the winding I, the rectifier G*x* will operate in pass direction. In this linking circuit, an output impulse is to appear when both, the binary signal *x* and the binary signal *y*, have the value 1. The operating position of the contact *ky* corresponds to the value of the signal *y*. The contact *ky* is in normal position, in which it is shown, when the signal *y* has the value 0, and in actuated position, when the signal has the value 1. In the first case, the voltage +U is placed on the winding II over the contact *ky* and the rectifier G*y*, and in the second case, the voltage —U will be placed on such winding. Accordingly, the rectifier *Gy* passes current when the signal has the value 1.

As already mentioned, a readout pulse is conducted to the linking circuit so as to obtain the linking result. In the circuit shown in FIG. 2, this readout pulse is the positive pulse *i* which is extended to the winding I over the readout terminal F. The impulse producing voltage must not be higher than the voltage +*U*. This applies likewise to the other embodiments which will be presently described in detail. An output impulse, representing the result signal, is in a given case delivered over the output terminal A. However, such output pulse can be delivered only when both rectifiers G*x* and G*y* pass current, since the readout impulse *i* can only in such case produce a current flow in the winding I which induces in the winding II a voltage impulse with a polarity, such that a current impulse can flow through the winding II and the rectifier G*y* disposed ahead thereof. This current impulse flows in such case through the resistor V which is connected to the output terminal A, such resistor serving as a receiver for the output impulse signifying the result signal. All these operations can be effected in the described manner only when the signals *x* and *y* have the value 1. Accordingly, the linking circuit is and And-gate circuit. In the event that the signal *x* or the signal *y* or both signals have the value 0, no current can flow in either or both windings I and II and no output impulse will be delivered.

Figure 2:
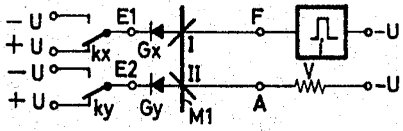
FIGS. 2 and 3 show circuits for respectively linking two binary signals.
Figure 3:
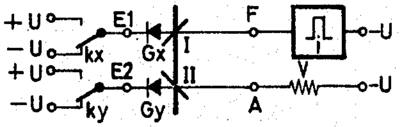

The linking circuit shown in FIG. 3 differs from the one represented in FIG. 2, merely in that the voltage —U, instead of +U, is in the presence of the binary value 0 connected to the rectifiers G*x* and G*y* over the contacts *kx* and *ky* in normal position thereof. Accordingly, +U voltage, instead of —U, will be connected to these rectifiers, over the contacts *kx* and *ky*, in the presence of the binary value 1 of the signals *k* and *y*. The contacts *ky* and *kx* will be in the normal position when both signals *y* and *x* have the value 0, and the readout impulse *i* extended over the readout terminal F will produce a current flow through the winding I, the rectifier G*x* being in pass direction owing to the voltage —U extended over the contact *kx*. The voltage impulse which is thereby induced in the winding II effects a current flow therethrough since the rectifier G*y* is likewise in pass condition owing to the voltage —U extended over the contact *ky*. An output impulse is, therefore, in such case of operation, delivered over the output terminal A as a result signal. However, when either or both signals have the value 0, there will be at least at one of the two rectifiers G*y*, G*x*, the voltage +U, since at least one of the contacts *kx*, *ky* will be in actuated position. The extension of the readout pulse *i* from the winding I to the winding II is in any such case prevented, and no output pulse is delivered over the output terminal A.

A linking circuit with such linking function is frequently designated as a Nor-gate circuit. If it is desired that no output pulse is to be delivered in the case of the operation considered first, while an output impulse is to be delivered to the receiver V in the three last considered cases of operation, this may be done by disposing an inversion circuit between the output terminal A and the receiver V. The resulting circuit arrangement will then have the function of an Or-gate circuit.

The windings I and II are, in the linking circuits according to FIGS. 1 and 2, wound in opposite sense of direction. However, they may be wound in identical sense of direction, for example, by changing the sense of winding direction of the winding II. The polarity of the rectifier G*y* will in such case also be changed. The linking circuits thus resulting, will have somewhat different linking functions, namely, blocking gate functions. Upon changing in this manner the circuit shown in FIG. 2, the delivery of an output pulse will be delayed so long as the signal *y* has the value 1. An output impulse will be delivered over the output terminal A only when the signal *y* has the valve 0 while the signal *x* has the value 1. The terminal E2, over which the signal *y* is delivered, serves in such case as a so-called blocking input and the terminal E1, over which the signal *x* is delivered, serves as a so-called pass-through input.

Upon changing, in the linking circuit shown in FIG. 3, the sense of direction of winding of the winding II and the polarization of the rectifier G*y*, the delivery of the output impulse will be delayed, so long as the signal *x* has the value 1. An output impulse will be delivered over the terminal A only when the signal *x* has the value 0 and the signal *y* the value 1. The terminal E1 serves in such case as the blocking input and the terminal E2 as the pass-through input of the blocking gate. In case the sense of direction of winding I, instead of winding II, is changed in the linking circuits according to FIGS. 2 and 3, with corresponding change of polarization of the cooperating rectifier, there will likewise result blocking gate circuits. However, the readout impulse will have negative polarity.

It was assumed in connection with the examples of linking circuits so far described, that two binary signals were processed, requiring in each case two windings. The invention is, however, also concerned with linking circuits which are adapted to process more than two signals.

Figure 4:
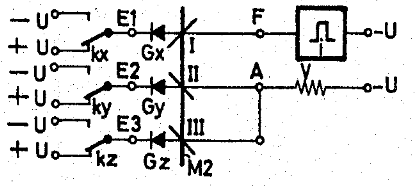
FIG. 4 represents a circuit for linking three binary signals.

FIG. 4 shows an example of a linking circuit for processing three binary signals and having, therefore, three windings. This linking circuit is obtained by adding to the linking circuit shown in FIG. 2, one auxiliary winding III which is wound in the same sense of direction as the winding II over which the output impulse is in a given case delivered in FIG. 2. To one end of the auxiliary winding III is connected a rectifier G*y*. The other end of the winding III is connected with the output terminal A to which is also connected the winding II. The three binary signals which can be processed by this circuit are the signals *x*, *y* and *z*. An output signal is, as in FIG. 2, delivered when the binary signals *x* and *y* have the value 1. However, owing to the symmetry of the circuit, an output signal will also be delivered, when the signals *x* and *z* have the binary value 1. Accordingly, an output signal is delivered when the signal *x* and the signal *y* or *z* have the binary value 1. The linking circuit therefore represents a combination of two And-gate circuits. The linking function may be supplemented by adding further windings. Such further windings may be wound with different sense of direction. They may, of course, be added also in connection with other linking circuits described herein and comprising two windings.

A plurality of individual linking circuits each having its own transformer, may be provided in order to obtain a given linking function. The readout impulse is in such case conducted in common to the respective windings of the transformers, the corresponding ends of the other windings of all transformers being for this purpose interconnected for the common delivery of the output impulse. An example of such a circuit arrangement is shown in FIG. 5, such arrangement resulting from a combination of the linking circuits shown in FIGS. 2 and 4, having the transformers M2 and M1.

In the circuit arrangement shown in FIG. 5, the linking circuit having the transformer M2 serves for processing three binary signals *x*, *y* and *z*, while the linking circuit having the transformer M1 serves for the processing of two further binary signals *v* and *w*. The windings I of the repeaters M1 and M2 are connected to the readout terminal F and the remaining windings of the two transformers are connected with the output terminal A. As may be readily recognized from a comparison of FIGS. 2 and 4, there will be delivered an output impulse, by the arrangement shown in FIG. 5, when the signals *x* and *y* to the signal *z* have the value 1 or when the signals *v* and *w* have the value 1. The combination of different linking circuits, each comprising a transformer, makes it possible to produce circuit arrangements for executing many different linking functions.

In the circuit examples described so far, the voltage alteration at the inputs of the linking circuits, connected with the alteration of the binary value of the signals to be linked, is effected with the aid of break-make contacts. These contacts can be avoided if the binary signals which are to be processed are supplied in suitable form, thereby also avoiding limitation of the operating speed of the linking circuits due to the mechanical inertia of the contacts. The signals which are to be processed can be supplied, for example, in the form of impulses or absence of impulses, which are utilized for the production of the required voltage alterations. FIG. 6 shows an example of a circuit making this possible.

FIG. 6 shows part of the transformer M1 of a linking circuit having the winding II. At the input terminal E2 of the winding II is connected the secondary winding S of the transformer M12 which has the primary winding P to which is extended the impulse *j* of the signal to be processed. The free end of the secondary winding S is connected with the voltage +U which may correspond to the binary value 0 of the signal to be processed. The voltage +U is in the normal condition over the secondary winding S effective at the input terminal E2. The rectifier connected at this point is in blocking condition. Upon appearance of the binary value 1 of the signal to be processed, the positive impulse *j* is extended to the primary winding P. Accordingly, owning to the sense of direction of winding of the windings P and S, an impulse will appear in the secondary winding S, such that the voltage at the input terminal E2 becomes negative during the appearance of the impulse *j*, thereby bringing about the desired voltage alteration at the input terminal E2.

Further transformer corresponding to the transformer M12 may be connected ahead of the various inputs of a linking circuit.

It is of course understood that transmission properties of all transformers employed in connection with the circuits described above are to be matched to the length of the impulses which are to be transmitted, so as to avoid disturbing distortions of the impulses.

Changes may be made within the scope and spirit of the appended claims which define what is believed to be new and desired to have protected by Letters Patent.

I claim:

1. A linking circuit comprising a first transformer having a primary winding and a plurality of secondary windings, a first plurality of rectifiers each connected in series with a respective one of said windings, a first plurality of linking signal sources each having two distinct values of signal, a first plurality of switching means each connected between a respective winding on one side of a respective rectifier and a respective one of said linking signal sources for selectively applying one of the two distinct values of signal to render the respective rectifier conductive or non-conductive respectively, a readout pulse source connected to said primary winding on the other side of the respective rectifier, an output means, said secondary windings being connected together on the other side of the respective rectifiers and connected to said output means.

2. The linking circuit as defined in claim 1 including a second transformer having a primary and a secondary winding, a second plurality of rectifiers each connected to said windings of said second transformer, a second plurality of linking signal sources each having two distinct values of signal, a second plurality of switching means each connected between a respective winding of said second transformer on one side of a respective rectifier and a respective one of said second plurality of linking signal sources, said readout pulse source connected on the other side of the respective rectifier to said primary winding of said second transformer, and each of said secondary windings of said first and second transformers being connected together on the other side of the respective rectifiers and connected to said output means.

References Cited by the Examiner

UNITED STATES PATENTS

| | | | |
|---|---|---|---|
| 2,817,079 | 12/1957 | Young | 340—347 |
| 2,972,060 | 2/1961 | Torrey | 307—88 |

BERNARD KONICK, *Primary Examiner.*

IRVING SRAGOW, *Examiner.*

R. R. HUBBARD, M. GITTES, *Assistant Examiners.*